United States Patent
Piumarta

(10) Patent No.: US 8,087,681 B2
(45) Date of Patent: *Jan. 3, 2012

(54) REINFORCED SKATEBOARD DECK

(75) Inventor: Timothy Piumarta, Soquel, CA (US)

(73) Assignee: NHS, Inc., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/830,298

(22) Filed: Jul. 3, 2010

(65) Prior Publication Data

US 2011/0003117 A1    Jan. 6, 2011

Related U.S. Application Data

(63) Continuation of application No. 11/940,233, filed on Nov. 14, 2007, now Pat. No. 7,748,725.

(51) Int. Cl.
*B62M 1/00* (2010.01)
(52) U.S. Cl. ............ 280/87.042; 280/87.043; 280/87.05
(58) Field of Classification Search .... 280/87.01–87.05, 280/87.041, 87.042
See application file for complete search history.

(56) References Cited

U.S. PATENT DOCUMENTS

| | | | |
|---|---|---|---|
| 4,182,520 A | 1/1980 | Stevenson | |
| 5,409,265 A | 4/1995 | Douglass | |
| 5,649,717 A * | 7/1997 | Augustine et al. | 280/610 |
| 6,059,307 A | 5/2000 | Western | |
| 6,182,986 B1 | 2/2001 | Smith | |
| 6,386,561 B1 * | 5/2002 | Hanson | 280/87.042 |
| 6,648,363 B2 | 11/2003 | Gordon | |
| 7,494,140 B2 | 2/2009 | Schmitt | |
| 7,669,879 B2 | 3/2010 | Dykema | |
| 2004/0183269 A1 | 9/2004 | Hadzicki et al. | |
| 2006/0097469 A1 * | 5/2006 | Nosworthy et al. | 280/87.042 |
| 2006/0103098 A1 | 5/2006 | Esposito et al. | |
| 2007/0069492 A1 | 3/2007 | Lin | |
| 2008/0036165 A1 | 2/2008 | Reinson | |
| 2009/0108554 A1 | 4/2009 | Boyle et al. | |
| 2011/0076449 A1 | 3/2011 | Woodall et al. | |

* cited by examiner

*Primary Examiner* — J. Allen Shriver, II
*Assistant Examiner* — Erez Gurari
(74) *Attorney, Agent, or Firm* — Advantage IP Law Firm

(57) ABSTRACT

A reinforced skateboard deck adapted to connect to a set of trucks and wheels to form a skateboard for riding with the deck having a reinforced region constructed to resist rupturing of the deck and a protective side barrier constructed to prevent wear of the reinforced region during use.

20 Claims, 3 Drawing Sheets

APPLY ADHESIVE AND MAKE STACK READY TO GO TO PRESS

KEEP WOOD FRAME    DISCARD

ALIGN VENEER TO EDGE OF MOLD, AND ONE END

REINFORCED SKATEBOARD DECK

This is a continuation application of U.S. Ser. No. 11/940,233, now U.S. Pat. No. 7,748,725, filed on Nov. 14, 2007, which is entitled Reinforced Skateboard Deck and hereby incorporated by reference in its entirety.

BACKGROUND OF THE INVENTION

1. Field of the Invention

The present invention relates to the field of skateboard decks, and more specifically, to skateboard decks incorporating destructive force resistant materials.

2. Background

Skateboards are typically used today to ride up, over, and oft of ramps and other structures, and the skateboard deck undergoes considerable stress when the rider and skateboard return to the ground. Skateboard decks have been strengthened by a laminated structure typically a seven-ply hardwood with the grain direction of the plies varied to provide strengthening in more than one direction. Such laminate decks are still subject to failure under significant impacts during typical skateboarding use. It is believed that a common failure of the laminate deck occurs where the top layer of the laminate will fail in tension when loaded, then the second sub-layer below that will in turn fail in tension, and then the next and next, working from the top of the deck to the bottom surface.

Skateboard decks have also been provided with fiber reinforcement, typically a fiberglass and resin matrix such as epoxy or other thermosetting resin. Fiber reinforced skateboards are known in the art, with some designs placing the fiber reinforcement between the hardwood veneer layers, while other designs have the fiber on the bottom or top major surface of the skateboard. It is believed that the location where a fiber reinforcement has the greatest effect in strengthening against common failure-inducing loads is the top major surface of the skateboard. When fiber reinforcement is placed in such a way as to be firmly and permanently adhered to the top major surface of the skateboard, the common failure mode is prevented from initiating. This is believed to be because the tensile load is distributed over not only the laminate structure of hardwood veneers, but also by augmenting the strength of the laminate structure by the fiber and resin matrix reinforcement. Propagation of rupture of the laminated hardwood veneers is believed to be reduced, because the fibers are both adding stiffness to the structure, and adding overall tensile strength to the skateboard.

Providing a layer of fiber reinforcement over the entire major surfaces of the skateboard deck has practical drawbacks given the common nature of use of skateboards where the edges of the deck are worn away by contact with the ground. The result of such contact and wearing away is that fibers are exposed at the edge of the deck. These exposed fibers, particularly in the case of glass or carbon fiber can be rigid and sharp. In the case of other fibers, such as aramid, or para-aramids or other engineering thermoplastic fibers, the exposed fibers are typically soft and pliable, but in any case create a cosmetically unattractive edge.

Therefore, what is needed and heretofore unavailable is a reinforced skateboard deck constructed to resist destructive forces typically occurring during use while protecting the reinforcing elements from wear and tear.

SUMMARY OF THE INVENTION

In accordance with a preferred embodiment of the present invention, a reinforced skateboard deck may incorporate a board with an upper foot bearing surface and a lower truck mounting surface and at least one layer spaced apart from the truck mounting surface. A protective side barrier further forms a protective sidewall to a reinforced region constructed of a fiber-reinforced material received in an opening in the layer with the protective side barrier and the reinforced region formed of different materials to provide a rupture resistant skateboard deck.

In one aspect of the present invention, the reinforced region may be constructed of a plurality of overlapping fiber-reinforced materials.

In another aspect of the present invention, the reinforced region and the protective side barrier are coplanar.

In yet another aspect of the present invention, the reinforced region and the protective side barrier having differing densities.

Other aspects of the present invention will become apparent with further reference to the following drawings and detailed description.

DETAILED DESCRIPTION OF THE PREFERRED EMBODIMENTS

Figure 1:
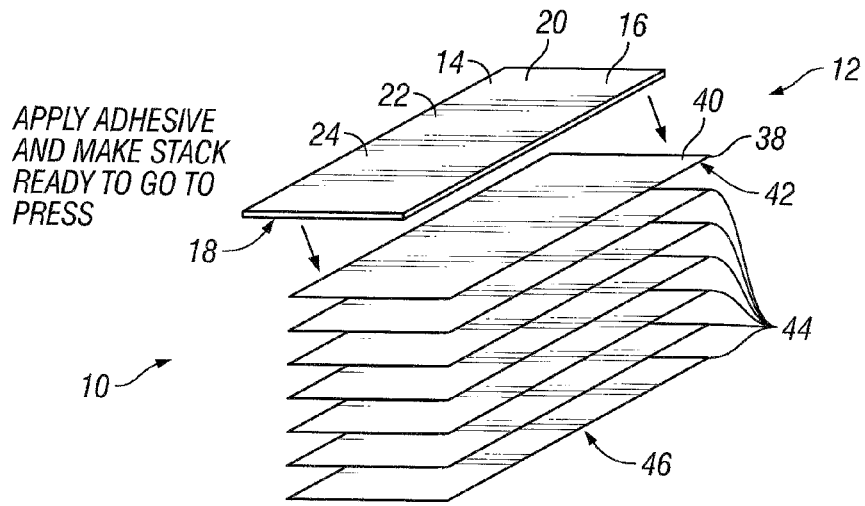
FIG. 1 is a perspective view of the layers of a skateboard deck in accordance with an embodiment of the present description, showing an upper layer formed of a fiber-reinforced layer inlaid within a veneer, and six additional layers, with varying strand orientations, prepared for assembly.

As shown in FIG. 1, a skateboard deck, indicated generally at 10, is typically formed of a series of wood veneer layers 12, which are stacked and assembled together. Alternatively, other suitable materials, such as thermoplastics, and non-layered constructions may be used.

An upper layer 14 provides a top surface 16 and a bottom surface 18. The top surface is typically the top structural (riding or foot bearing) surface of the skateboard deck, although a grip tape or other similar layer may be applied over the top surface. Upper layer 14 includes an inlaid, fiber-reinforced layer 20 that provides a portion of top surface 16.

Fiber-reinforced layer 20 is typically formed substantially of woven para-aramid fibers. The fiber-reinforced layer may be made with unidirectional or bi-directional para-aramid fibers loosely woven into a fabric. As an example, layer 20 may include Kevlar®.RTM (resin transfer molded) fabric encased in an adhesive matrix. As an example, the Kevlar® fabric may be substantially saturated with polyurethane, which is then allowed to harden before further processing. Other components of the adhesive matrix would include a resin of epoxy or polyvinyl.

Fiber-reinforced layer 20 defines an edge 22 (see also FIG. 5), and typically has an oval or racetrack shape, although other shapes may be used as desirable for a particular skateboard design.

Upper layer 14 typically includes a side barrier 24 that also provides a portion of top surface 16. Preferably, the side barrier and the fiber-reinforced layer together provide the entire top surface but alternatively other structure may provide a part of the top surface. Also preferably, the side barrier extends around the entire edge of the fiber-reinforced layer. Alternatively, the side barrier extends around only a portion of the edge of the fiber-reinforced layer, in which case some other structure may run alongside a portion of the fiber-reinforced layer or no structure as suitable to the desired skateboard design. The side barrier is typically a wood veneer, and as such includes the fibrous material that is naturally found in wood, however, the side barrier typically does not include any fiber reinforcement such as to leave behind a fringe or sharp edge of fibers as may be the case with Kevlar® or glass or carbon fibers. Alternatively, side barrier 24 may be formed from a thermoplastic sheet.

Figure 2:
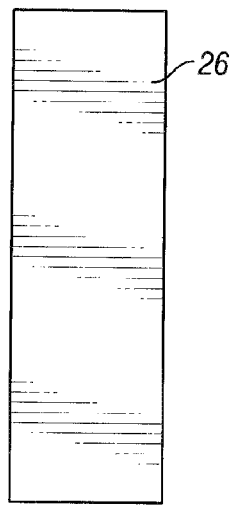
FIG. 2 is a top plan view of the veneer for the upper layer prior to an initial cutting, showing a typical dimension.
Figure 3:
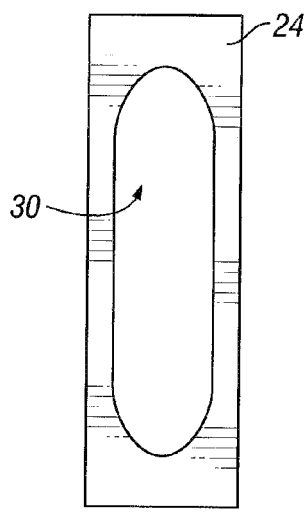
FIG. 3 is a top plan view of the veneer of FIG. 2 with a central portion removed to provide a side barrier defining a central opening.

As best seen in FIGS. 2 and 3, side barrier 24 is made by starting with a wood veneer blank 26 from which a central portion 28 is removed to provide a central opening 30, typically in an oval or racetrack shape, but alternatively with any shape suited to the specific skateboard. Thus, central opening 30 is defined by side barrier 24.

Figure 4:
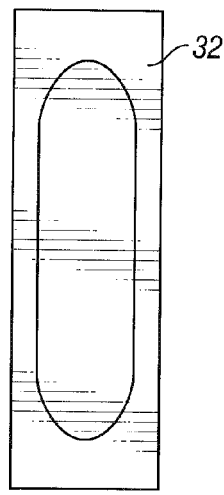
FIG. 4 is a top plan view of the fiber-reinforced layer for the upper layer, showing a typical dimension, prior to an initial cutting.
Figure 5:
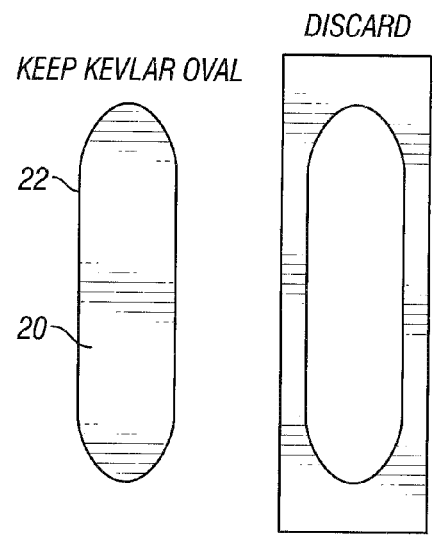
FIG. 5 is a top plan view of the fiber-reinforced layer, after cutting to a typical shape, to fit the layer into the central opening of the side barrier.

As best seen in FIGS. 4 and 5, fiber-reinforced layer 20 is made by starting with a sheet of woven Kevlar® fabric 32 encased in an adhesive matrix, such as by substantial saturation with polyurethane. Sheet 32 is cut into an oval racetrack, or other suitable shape to produce layer 20, which is preferably closely fitted for central opening 30 of side barrier 24 (see FIG. 6).

Side barrier 24 and fiber-reinforced layer 20 are preferably die cut from blank 26 and sheet 32, respectively, but any suitable means may be used. With die-cutting, the same press and die may be used to cut both the blank and the sheet. Side barrier 24 and fiber-reinforced layer 20 are typically of equal thickness although some variation is permitted. Alternatively, the fiber-reinforced layer may be substantially thinner, with the difference made up by a spacer layer 34 (see FIGS. 8 and 9), typically of the same shape, such as oval, as fiber-reinforced layer 20. Spacer layer 34 may be affixed, e.g., by adhesive, to the bottom surface of fiber-reinforced layer 20, and may be cut to shape either separately or together with the fiber-reinforced layer.

Figure 6:
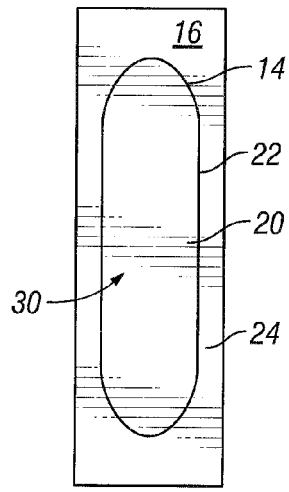
FIG. 6 is a top plan view of the fiber-reinforced layer and the side barrier assembled to provide the upper layer.
Figure 7:
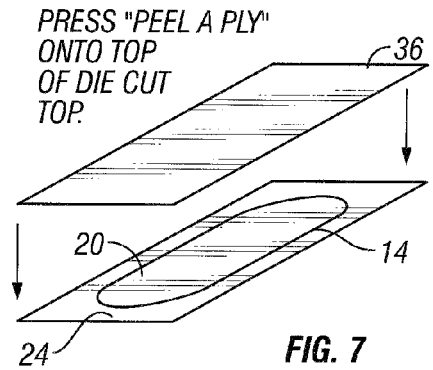
FIG. 7 is a perspective view of a removable adhesive tape being applied to the fiber-reinforced layer and the side barrier to hold them together.

As shown in FIGS. 6 and 7, after fiber-reinforced layer 20 and side barrier 24 are combined by placing layer 20 within central opening 30, they may be temporarily held together by application of an adhesive tape 36, e.g., the Peel A Play tape made by the R Tape Corporation of New Jersey. Adhesive tape 36 may be applied by a heat transfer press.

Figure 8:
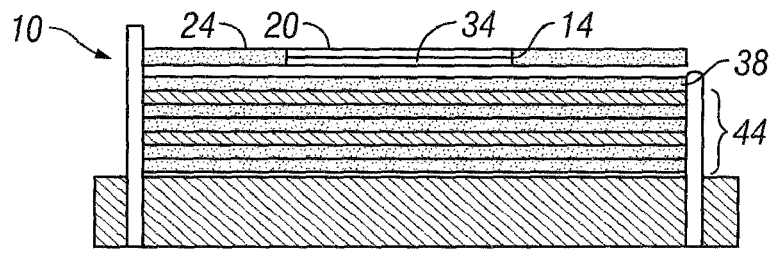
FIG. 8 is an end elevation view of the layers arranged together, including a spacer layer beneath the fiber-reinforced layer, showing a typical dimension.
Figure 9:
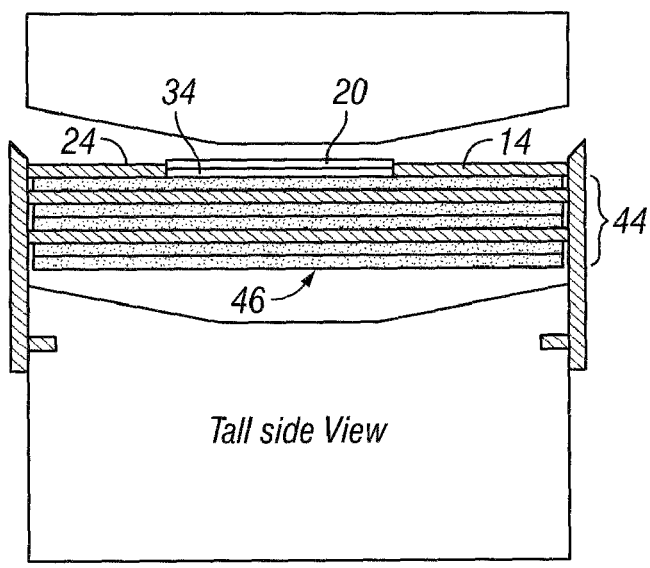
FIG. 9 is an end elevation view of a mold pressing the layers together to form a blank skateboard deck which may subsequently be cut to a desired size and shape.

As best seen in FIGS. 1, 8, and 9, skateboard deck 10 may include a first lower layer 38, typically a wood veneer, defining an upper surface 40 and a lower surface 42. Upper layer 14, comprising side barrier 24 and fiber-reinforced layer 20, is affixed, typically by application of adhesive and subsequent press molding at suitable heat and temperature, to first lower layer 38. Additional lower layers may be included as desired in consideration of desired weight and strength factors. For example, second, third, fourth, fifth, sixth, and seventh lower layers 44, with ultimate bottom surface 46, may be affixed successively beneath the first lower layer, typically by application of adhesive and subsequent press molding at suitable heat and temperature.

Typically the lower layers are wood or other structural material with a strand orientation that is varied from layer to layer. As an example, with seven lower layers, two may be oriented to provide maximum cross board strength, while the remaining five maximize along board strength, although this scheme will be varied as appropriate for the desired performance characteristics.

Figure 10:
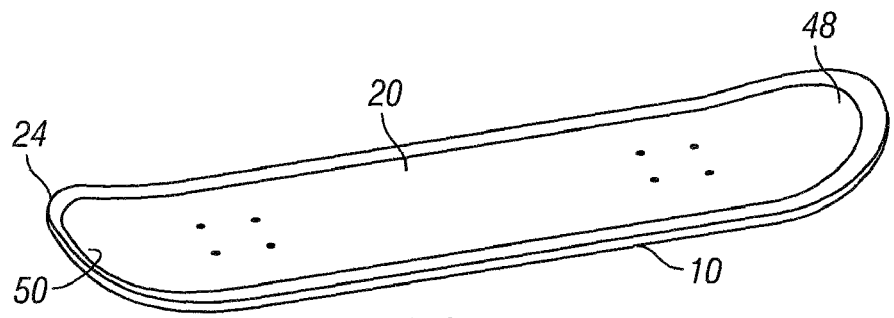
FIG. 10 is a perspective view of a skateboard deck press molded to provide a raised nose and tail and cut to a final desired shape.

FIGS. 1, 8, and, 9 also illustrate that fiber-reinforced layer 20 is inlaid within side barrier 14, and side barrier 14 preferably surrounds substantially all of edge 22 of fiber-reinforced layer 20. As shown in FIG. 10, skateboard deck 10 may be press-molded to provide a raised tail 48 and a raised nose 50 and cut to a final desired shape. Furthermore, deck 10 may be drilled for truck mounting holes, and then trucks, bearing and wheels may be mounted to provide a skateboard ready for riding. A grip tape or other suitable tape, stickers or the like may be affixed over the top surface. Preferably the upper surface of fiber-reinforced layer 20 and the upper surface of side barrier 24 are flush with one another, presenting a smooth transition with no visible step.

Alternatively, upper layer 14 may be formed substantially of an adhesive matrix including a central portion of woven fiber encased therein to provide the fiber-reinforced layer. In this embodiment, the adhesive matrix includes an outer portion without woven fiber to provide the side barrier.

As described herein, skateboard deck 10 includes a top (or foot bearing) surface 16 for the rider's feet, and a bottom surface 46 for the connection of trucks and wheels. The top surface is provided in part by a fiber-reinforced layer 20. The top surface is further provided by a side barrier 24 extending around at least a portion of the fiber-reinforced layer.

Typical thicknesses for the fiber-reinforced layer after saturation with polyurethanes are between about 0.010 to about 0.050-inches. Typical thicknesses for side barrier 14 is between about 0.040 to about 0.065-inches. The thickness of spacer layer 34 typically is adjusted to the appropriate thickness to accommodate the difference between fiber-reinforced layer 20 and side barrier 24 and provide a flush top surface 16. As an example, where side barrier 14 is 0.060-inches thick, and fiber-reinforced layer 20 is 0.020-includes thick, spacer layer 14 is preferably 0.040-inches in thickness. All of these dimensions may be varied within and beyond these ranges as suited to the particular skateboard design.

Side barrier 14 may have varying width dimensions relative to skateboard deck 10 and fiber-reinforced layer 20. The dimensions of the side barrier may be substantially uniform around the edge of the skateboard, or they may vary significantly as desired for specific skateboard characteristics. For example, the side barrier may be narrower along the sides as compared to the nose and tail. Side barrier 14 preferably has a minimum width of 0.125-inches along each long side of the skateboard. Side barrier 14 preferably has a width dimension between about 0.125-inches and about 6-inches adjacent the nose and tail of the skateboard. All of these dimensions may, be varied within and beyond these ranges as suited to the particular skateboard design. With this design, fiber-reinforced layer 20 is inset away from the edge of the skateboard, so that the fibers are shielded from contact when the skateboard edges are scraped on the ground or other surface. Fiber-reinforced layer 20 is preferably inlaid on top surface 16 of deck 10, and additionally or alternatively may be inlaid on lower surface 42.

It will be appreciated that the incorporation of the fiber-reinforced layer 20 and/or the fiber-reinforced layer as bonded to another layer of the deck assists in significantly resisting tensile forces commonly associated with use and improves the overall rupture resistance of the deck. When used at or near the top layer as a part thereof, the effectiveness of this rupture resistance feature increases.

While the present invention has been described herein in terms of a number of preferred embodiments for skateboard decks, various changes and improvements may also be made to the invention without departing from the scope thereof. The subject matter described herein includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

What is claimed is:

1. A reinforced skateboard deck comprising:
a board having an intermediate section with a pair of opposing lateral edge sidewalls between a tail section and a nose section, the board having a lowermost truck mounting surface and a top layer providing an exposed upper foot bearing surface spaced apart from the truck mounting surface;
an exposed protective side barrier constructed at least partially of a natural fibrous material and including a first region forming at least a portion of the opposing lateral edge sidewalls of the board and a second region forming at least a portion of the top layer of the board and defining an opening; and
at least one reinforced region constructed of a fiber-reinforced material and disposed within the opening of the second region, with the second region of the protective side barrier and the reinforced region cooperating to provide portions of the exposed upper foot bearing surface.

2. The skateboard deck of claim 1 wherein:
the reinforced region is constructed of a plurality of overlapping layers of fiber-reinforced material.

3. The skateboard deck of claim 1 wherein:
the reinforced region and the second region of the protective side barrier cooperate to form a dual density rupture resistant layer.

4. The skateboard deck of claim 1 wherein:
the reinforced region is constructed of a plurality of overlapping fiber-reinforced layers saturated with polyurethane and having edges abutting and directly bonded to the interior edges of the opening of the protective side barrier.

5. The skateboard deck of claim 1 wherein:
the reinforced region and at least a portion of the protective side barrier include coplanar complementary portions that form the upper foot bearing surface of the board.

6. The skateboard deck of claim 1 wherein:
the foot bearing surface is at least partially covered with a grip-enhancing material.

7. The skateboard deck of claim 1 wherein:
the top layer is constructed to resist tension across the exposed foot bearing surface of the board.

8. The skateboard deck of claim 1 wherein:
the interior edges of the opening of the protective side barrier completely surround a perimeter of the reinforced region.

9. The skateboard deck of claim 1 wherein:
the board includes plurality of layers bonded together and having differing grain orientations.

10. The skateboard deck of claim 1 wherein:
the board is substantially formed of a thermoplastic material.

11. The skateboard deck of claim 1 wherein:
the reinforced region extends into the nose and tail sections and is continuous.

12. A skateboard deck comprising:
a board having an intermediate section with a pair of opposing lateral edge sidewalls between a tail section and a nose section, the board further having a top layer projecting at least partially across the board and providing an upper exposed foot bearing surface, on which a rider may position one or both feet directly or indirectly using foot apparel, and a spaced apart lower layer with an exposed bottom surface providing a truck mounting region for mounting a set of wheel trucks to the board;
a protective side barrier constructed at least partially of a natural fibrous material and including a first region forming at least a portion of the opposing lateral sidewalls of the board and a second region forming at least a portion of the top layer and including a die cut opening with a pair of opposing interior edges; and
at least one reinforced region constructed of a synthetic fiber-reinforced material disposed within the opening of the second region, the reinforced region and second region of the protective side barrier forming complementary portions of the exposed foot bearing surface.

13. The skateboard deck of claim 1 further including:
the reinforced region is positioned above a centerpoint of the sidewalls.

14. A skateboard deck comprising:
a board having an intermediate section with a pair of opposing lateral edge sidewalls transitioning from a tail section to a nose section, the board further having an uppermost exposed foot bearing surface and a spaced apart lowermost exposed truck mounting surface;
a protective side barrier including a first region forming at least an exposed portion of the opposing lateral sidewalls of the board and a second region defining at least a first portion of the uppermost exposed foot bearing surface and further defining an opening with a pair of opposing interior edges; and
at least one reinforced region defining at least a second portion of the uppermost exposed foot bearing surface and constructed of a fiber-reinforced material disposed within the opening of the second region, with the second region of the protective side barrier and the reinforced region being formed of different materials and the first and second portions of the uppermost exposed foot bearing surface being substantially coplanar.

15. The skateboard deck of claim 1 wherein:
the reinforced region is coextensive with the opening and abuts the opposing interior edges of the protective side barrier.

16. The skateboard deck of claim 1 further including:
a plurality of support layers; and
a bonding layer between a surface of the reinforced region and an adjacent support layer.

17. The skateboard deck of claim 1 wherein:
the upper foot bearing surface of the board is inlaid with the reinforced region; and
the truck bearing surface of the board is inlaid with a second reinforced region.

18. The skateboard deck as set forth in claim 12 further including:
a plurality of support layers; and
a bonding layer between a surface of the reinforced region and an adjacent support layer.

19. The skateboard deck as set forth in claim 14 further including:
a plurality of support layers; and
a bonding layer between a surface of the reinforced region and an adjacent support layer.

20. The skateboard deck as set forth in claim 14 wherein:
the reinforced region and the second region of the protective side barrier cooperate to form a dual density rupture resistant layer.

* * * * *